United States Patent
Kim et al.

(10) Patent No.: US 11,470,844 B2
(45) Date of Patent: Oct. 18, 2022

(54) VESPIDAE WASP REPELLENT

(71) Applicant: KINP CO., LTD, Kochi (JP)

(72) Inventors: Chul Sa Kim, Kochi (JP); Toshihide Ichikawa, Kagawa (JP); Shuhei Nakajima, Okayama (JP)

(73) Assignee: KINP CO., LTD, Kochi (JP)

( * ) Notice: Subject to any disclaimer, the term of this patent is extended or adjusted under 35 U.S.C. 154(b) by 0 days.

(21) Appl. No.: 15/774,745

(22) PCT Filed: Oct. 31, 2016

(86) PCT No.: PCT/JP2016/082345
§ 371 (c)(1),
(2) Date: May 9, 2018

(87) PCT Pub. No.: WO2017/082108
PCT Pub. Date: May 18, 2017

(65) Prior Publication Data
US 2018/0325107 A1  Nov. 15, 2018

(30) Foreign Application Priority Data

Nov. 11, 2015 (JP) .............................. JP2015-221379

(51) Int. Cl.
| | |
|---|---|
| A01N 31/04 | (2006.01) |
| A01N 25/00 | (2006.01) |
| A01N 25/02 | (2006.01) |
| A01N 31/14 | (2006.01) |
| A01N 37/02 | (2006.01) |

(52) U.S. Cl.
CPC ............. *A01N 31/04* (2013.01); *A01N 25/00* (2013.01); *A01N 25/02* (2013.01); *A01N 31/14* (2013.01); *A01N 37/02* (2013.01)

(58) Field of Classification Search
CPC .......... A61P 33/00; A61P 33/14; A01N 31/04; A01N 25/00; A01N 25/02; A01N 31/14; A01N 37/02
USPC ................................ 514/546, 730, 875, 919
See application file for complete search history.

(56) References Cited

U.S. PATENT DOCUMENTS

| | | | |
|---|---|---|---|
| 4,234,567 A | 11/1980 | Flanner | |
| 6,051,612 A * | 4/2000 | Borden | A01N 31/04 514/699 |
| 6,706,760 B2 * | 3/2004 | Matsunaga | A01N 27/00 424/405 |
| 6,713,518 B1 | 3/2004 | Bessette et al. | |
| 6,849,614 B1 | 2/2005 | Bessette et al. | |
| 7,109,240 B2 * | 9/2006 | Bessette | A01N 25/08 424/84 |
| 9,015,988 B2 * | 4/2015 | Zhang | A01M 1/145 43/107 |
| 2005/0004233 A1 | 1/2005 | Bessette et al. | |
| 2007/0004686 A1 * | 1/2007 | Bengtsson | A01N 65/34 514/159 |
| 2011/0086918 A1 * | 4/2011 | Ciccognani | A61K 9/08 514/557 |
| 2012/0107428 A1 * | 5/2012 | Schneidmiller | A01N 65/12 424/742 |
| 2012/0270944 A1 | 10/2012 | Zhang et al. | |
| 2012/0280055 A1 | 11/2012 | Sclmeidmiller et al. | |
| 2013/0004603 A1 | 1/2013 | Schneidmiller et al. | |
| 2014/0220164 A1 | 8/2014 | Manhas et al. | |
| 2014/0242199 A1 | 8/2014 | Manhas et al. | |
| 2017/0245493 A1 * | 8/2017 | Gezundhait | A01N 65/08 |

FOREIGN PATENT DOCUMENTS

| | | |
|---|---|---|
| DE | 40 12 224 | 10/1991 |
| JP | 7-126110 | 5/1995 |
| JP | 2003-221302 | 8/2003 |
| JP | 2004-75657 | 3/2004 |
| JP | 2009-173608 | 8/2009 |
| JP | 2011-144151 | 7/2011 |
| JP | 2012-70686 | 4/2012 |

(Continued)

OTHER PUBLICATIONS

Extended European Search Report dated May 6, 2019 in corresponding European Patent Application No. 16864071.2.
International Search Report dated Dec. 20, 2016 in International (PCT) Application No. PCT/JP2016/082345.
Zhang et al., "Essential oils and their compositions as spatial repellents for pestiferous social wasps", Pest. Manag. Sci., vol. 69, 2013, pp. 542-552.
Office Action dated Mar. 13, 2020 in corresponding Chinese Patent Application No. 201680065832.9, with English Translation.
Office Action dated Jan. 28, 2020 in corresponding Indian Patent Application No. 201847019481 with English-language translation.
Office Action dated Feb. 27, 2020 in corresponding Australian Patent Application No. 2016352730.

(Continued)

*Primary Examiner* — Jared Barsky
(74) *Attorney, Agent, or Firm* — Wenderoth, Lind & Ponack, L.L.P.

(57) ABSTRACT

The objective of the present invention is to provide a repellent which has a selectivity. Specifically, the repellent does not cause damage to an Apidae bee but suppresses the aggression of a Vespidae wasp and prevents a Vespidae wasp from coming close and building a nest. Also, the objective of the present invention is to provide a method for repelling a Vespidae wasp. The Vespidae wasp repellent according to the present invention is characterized in comprising a compound represented by the following formula (I) as an active component:

wherein $R^1$ is hydrogen atom or the like, X is a $C_{1-4}$ alkylene group or the like, α is a substituent, n is an integer of 0 or more and 5 or less.

6 Claims, 4 Drawing Sheets

(56) References Cited

FOREIGN PATENT DOCUMENTS

| JP | 2014-534184 | 12/2014 |
|----|-------------|---------|
| JP | 2015-13814 | 1/2015 |
| JP | 2015-93846 | 5/2015 |
| JP | 2015-174822 | 10/2015 |
| JP | 2016-74645 | 5/2016 |
| WO | 01/91554 | 12/2001 |
| WO | 2012/021531 | 2/2012 |
| WO | 2017/051302 | 3/2017 |

OTHER PUBLICATIONS

Office Action dated Oct. 21, 2020 in Korean Patent Application No. 10-2018-7014154, with English-language translation.
Office Action dated Aug. 24, 2020 in Chinese Patent Application No. 201680065832.9, with English-language translation.
Office Action dated Dec. 2, 2020 in European Patent Application No. 16 864 071.2.
Office Action dated Sep. 12, 2019 in corresponding Australian Application No. 2016352730.
English translation of Notice of Reasons for Refusal dated Oct. 8, 2019 in corresponding Japanese Application No. 2015-221379.

* cited by examiner

VESPIDAE WASP REPELLENT

TECHNICAL FIELD

The present invention relates to a repellent by which aggression of a harmful wasp classified in Vespidae can be reduced and by which approaching and nesting by a Vespidae wasp can be inhibited, and a method for repelling a Vespidae wasp.

BACKGROUND ART

A hornet is so big that it was named after a sparrow in Japanese according to a certain estimate. In addition, a hornet is so aggressive that even when someone merely approaches a nest, a hornet may attack him in some cases. A hornet is particularly dangerous from August to October, and a hornet may attack other organisms for protecting a nest and for dominating a feeding site such as a sawthorn oak, which bleeds sap. A hornet venom is a mixture of a neurotoxin such as serotonin and acetylcholine, histamine promoting inflammation, a peptide which causes anaphylactic shock, and an enzyme to degrade a cell membrane and a protein, and a toxicity thereof is very high. In addition, a sting of a hornet is not pulled out due to only one attack and can attack multiple times in contrast to a sting of a honeybee, since the sting of a hornet does not have a barb structure. A hornet, therefore, tends to sting a target of attack many times until a toxic venom is consumed due to aggression.

A hornet builds a nest in a hollow and underground in a forest generally, but in some cases, in a space under an awning and in the ceiling of a private house. As a result, an accident happens, since an activity range of a hornet overlaps a residence place of a human. A hornet is sometimes attracted to an alcoholic beverage or a juice of a human who enjoys a hike and a barbecue in a forest having a hornet's nest or near a hornet's nest, and stings a human who reaches his hand for the alcoholic beverage or juice while he is not aware of the hornet.

In fact, the number of a fatal case due to a hornet is much more than that due to other harmful organisms such as a bear and a poisonous snake. In Japan, dozens are dead each year due to a hornet. The number of a fatal case has relatively become decreased after 2000, but ten to thirty people are still dead each year due to a hornet.

Polistinae in addition to Vespinae is classified into Vespidae. Although the aggression and toxicity of a Polistinae wasp are weaker than those of a hornet, a Polistinae wasp is a harmful organism similarly to a hornet, since a Polistinae wasp builds a nest at a private house and there is a fatal case due to a Polistinae wasp. Accordingly, a measure against a Vespidae wasp has been required.

Patent document 1 discloses a pest control formulation containing a pesticidal natural oil and a polar aromatic solvent. Such a polar aromatic solvent is exemplified by benzyl alcohol, and a target harmful organism is exemplified by Hymenoptera insect.

In Patent document 2, benzyl alcohol and β-phenylethyl-alcohol (2-phenylethanol) are exemplified as repellent components against a fiber insect pest. On the one hand, in Patent document 3, phenethyl alcohol (phenylethanol) is exemplified as a supplementary additive component for a synthetic attractant for capturing and killing a hornet.

PRIOR ART DOCUMENT

Patent Document

Patent document 1: JP 2014-534184 T
Patent document 2: JP H7-126110 A
Patent document 3: JP 2003-221302 A

DISCLOSURE OF THE INVENTION

Problems to be Solved by the Invention

As described above, since a Vespidae wasp is a harmful insect and is blamed for many deaths every year, a measure against a Vespidae wasp is required. An insecticide for a wasp containing a pyrethroid insecticide is commercially available; however, as a practical measure, a nest made in a private house is removed by an expert at most, and it is impossible to eliminate a death case. A group of highly aggressive hornets attack a person who merely approaches a nest in some cases. In such a case, there is no guarantee that aggression is lost by an insecticide spray from spraying to an onset of action, thus it is extremely difficult to completely prevent the attack.

The above-described Patent document 1 discloses benzyl alcohol as a component of an insecticidal composition and a Hymenoptera insect as a target harmful organism; however, an insect which is actually tested is a louse only, and a wasp is not tested. As described above, an insecticide is not sufficient as a countermeasure to a Vespidae wasp. In addition, a target of a repellent described in Patent document 2 is an adult textile pest insect, and a countermeasure to a wasp is not described at all. On the one hand, in Patent document 3, phenethyl alcohol, i.e., phenylethanol is exemplified as a supplementary additive component in an agent to chemoattract a hornet, not to repel a hornet.

It has been known that a honeybee among bees is a useful insect which is utilized to produce honey, but a hornet impacts the bee industry by attacking a nest of a honeybee to obtain a larva and pupa as a feed. An insecticide for a wasp such as a pyrethroid insecticide, however, cannot be used for repelling a hornet attacking a nest of a honeybee, since such an insecticide also causes damage to a honeybee.

Under the above-described circumstances, the objective of the present invention is to provide a repellent which has a selectivity. Specifically, the repellent does not cause damage to an Apidae bee but suppresses the aggression of a Vespidae wasp and prevents a Vespidae wasp from coming close and building a nest. Also, the objective of the present invention is to provide a method for repelling a Vespidae wasp.

Means for Solving the Problems

The inventors of the present invention made extensive studies to solve the above problems. As a result, the inventors completed the present invention by finding that a compound having a simple structure, such as benzyl alcohol and an analog thereof, has an excellent selectivity that the compound can promptly suppress the aggression of a Vespidae wasp and repel a Vespidae wasp, but does not cause damage to an Apidae bee.

Hereinafter, the present invention is described.

[1] A Vespidae wasp repellent, comprising a compound represented by the following formula (I) as an active component:

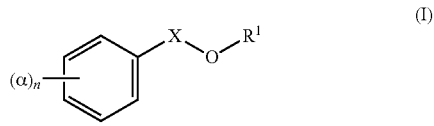

wherein

R$^1$ is a hydrogen atom, a C$_{1-4}$ alkyl group optionally having a substituent β, a C$_{2-4}$ alkenyl group optionally having a substituent β or a C$_{1-4}$ alkyl-carbonyl group optionally having a substituent β;

X is a C$_{1-4}$ alkylene group optionally having a substituent γ or a C$_{2-4}$ alkenylene group optionally having a substituent γ;

α is one or more substituents selected from a C$_{1-4}$ alkyl group optionally having a substituent δ, a C$_{2-4}$ alkenyl group optionally having a substituent δ, a C$_{1-4}$ alkoxy group optionally having a substituent δ, a C$_{1-4}$ alkyl-carbonyl group optionally having a substituent δ, a C$_{1-4}$ alkyl-carbonyloxy group optionally having a substituent δ, a halogeno group and a hydroxy group;

the substituent β, substituent γ and substituent δ are independently one or more substituents selected from the group essentially consisting of a C$_{1-4}$ alkoxy group, a C$_{1-4}$ alkyl-carbonyl group, a C$_{1-4}$ alkyl-carbonyloxy group, a halogeno group and a hydroxy group; and n is an integer of 0 or more and 5 or less.

Hereinafter, the compound represented by the formula (I) is abbreviated as "compound (I)".

[2] The Vespidae wasp repellent according to the above [1], wherein the Vespidae wasp is a Vespinae wasp.

[3] The Vespidae wasp repellent according to the above [1] or [2], further comprising a pyrethroid-based insecticidal ingredient.

[4] The Vespidae wasp repellent according to the above [3], wherein the pyrethroid-based insecticidal ingredient is one or more selected from the group essentially consisting of metofluthrin, prallethrin, momfluorothrin, resmethrin, phthalthrin, etofenprox, cyphenothrin, profluthrin, cyfluthrin and tetramethrin.

[5] A method for reducing aggression of the Vespidae wasp, comprising the step of spraying the Vespidae wasp repellent according to any one of the above [1] to [4] on the Vespidae wasp, wherein the Vespidae wasp repellent is liquid.

[6] A method for preventing the Vespidae wasp from coming close and nesting, comprising the step of putting or applying the Vespidae wasp repellent according to any one of the above [1] to [4] on or around a place, wherein the Vespidae wasp has to be prevented from coming close to the place and nesting at the place.

[7] The method according to the above [6], wherein the place is a beehive.

[8] Use of the compound (I) for repelling a Vespidae wasp.

[9] The use of the compound (I) according to the above [8], wherein the Vespidae wasp is a Vespinae wasp.

[10] The use of the compound (I) according to the above [8] or [9], wherein a pyrethroid-based insecticidal ingredient is further used in combination.

[11] The use of the compound (I) according to the above [10], wherein the pyrethroid-based insecticidal ingredient is one or more selected from the group essentially consisting of metofluthrin, prallethrin, momfluorothrin, resmethrin, phthalthrin, etofenprox, cyphenothrin, profluthrin, cyfluthrin and tetramethrin.

[12] A method for repelling a Vespidae wasp, comprising the step of spraying a repellent comprising the compound (I), or the step of putting or applying a repellent comprising the compound (I) on or around a place, wherein the Vespidae wasp has to be prevented from coming close to the place and nesting at the place.

[13] The method according to the above [12], wherein the repellent comprising the compound (I) is liquid.

[14] The method according to the above [12] or [13], wherein the place is a beehive.

[15] The method according to any one of the above [12] to [14], wherein the Vespidae wasp is a Vespinae wasp.

[16] The method according to any one of the above [12] to [15], wherein the repellent further comprises a pyrethroid-based insecticidal ingredient.

[17] The method according to the above [16], wherein the pyrethroid-based insecticidal ingredient is one or more selected from the group essentially consisting of metofluthrin, prallethrin, momfluorothrin, resmethrin, phthalthrin, etofenprox, cyphenothrin, profluthrin, cyfluthrin and tetramethrin.

Effect of the Invention

The repellent of the present invention can promptly suppress the aggression of a Vespidae wasp. A person therefore can take along a liquid present invention repellent to control a Vespidae wasp, when the person enters into a place where there may be a nest of a Vespidae wasp. In addition, when a person removes a nest of a Vespidae wasp, the present invention repellent can be used for suppressing the aggression. Furthermore, a Vespidae wasp has a detestation of the present invention repellent; therefore, a Vespidae wasp can be continuously prevented from coming close to or building a nest at a desired place by placing or applying the present invention repellent on the place. In addition, the present invention repellent does not cause damage to an Apidae bee; therefore, a Vespidae wasp is prevented from coming close or attacking to a nest of an Apidae bee by spraying, placing or applying the present invention repellent on the nest or the surround thereof without causing damage to an Apidae bee as a useful insect. Accordingly, the present invention is very useful for controlling a Vespidae wasp, which is the most dangerous organism, and which not only causes economical damage to the bee industry by attacking a nest of an Apidae bee to be annihilated but also directly attacks to and kills a person.

BRIEF DESCRIPTION OF THE DRAWINGS

FIG. 1A is an image in the case of using distilled water, FIG. 1B is an image in the case of using 2-phenylethanol, and FIG. 1C is an image in the case of using benzyl alcohol.

FIG. 2A is an image in the case of using distilled water, FIG. 2B is an image in the case of using 2-phenylethanol, and FIG. 2C is an image in the case of using benzyl alcohol.

FIG. 3A is an image in the case of using distilled water, FIG. 3B is an image in the case where 2-phenylethanol was sprayed on a new black ball, and FIG. 3C is an image in the case where benzyl alcohol was sprayed on the black ball on which alarm pheromone was adsorbed.

MODE FOR CARRYING OUT THE INVENTION

Figure 1:
FIG. 1 are images of a video footage which records the attack situation against a black ball when stimulating the nest of *Vespa mandarinia* with the black ball on which a test liquid is sprayed.
Figure 1:
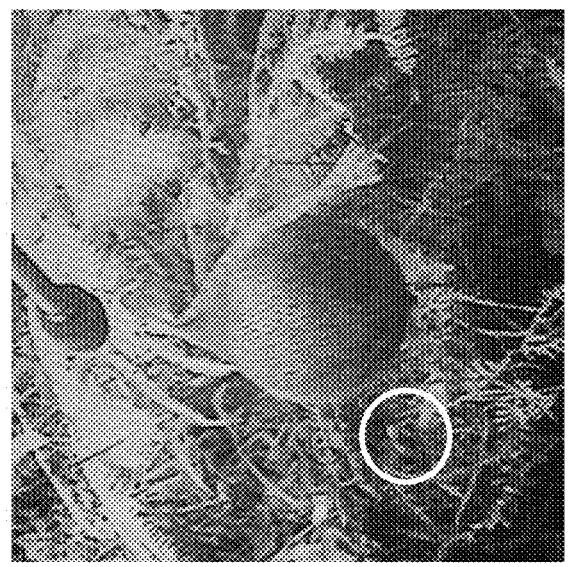
Figure 1:
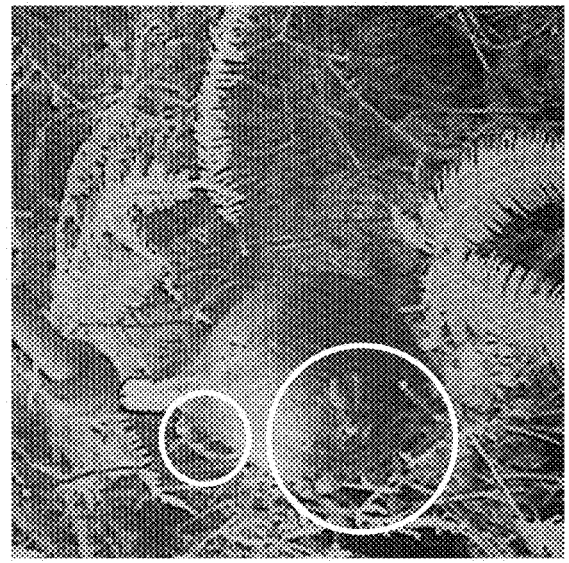

The target to be controlled of the present invention repellent is a wasp belonging to the Vespidae. A Vespidae wasp is exemplified by a wasp belonging to the Vespinae and Polistinae.

A wasp belonging to the Vespinae is exemplified by *Vespa mandarinia*, *Vespa simillima xanthoptera*, *Vespa ducalis*, *Vespa analis*, *Vespa crabro flavofasciata*, *Vespa dybowskii*, *Vespula flaviceps*, *Vespula shidai* and *Vespula austriaca*.

A wasp belonging to the Polistinae is exemplified by an autochthonous wasp such as *Polistes rothneyi*, *Polistes jokahamae*, *Polistes chinensis*, *Polistes japonicus*, *Polistes mandarinus*, *Polistes snelleni*, *Polistes rothneyi yayeyamae*, *Parapolybia indica* and *Parapolybia varia*. In addition to the autochthonous wasp, a wasp belonging to the Polistinae is exemplified by *Vespa velutina* and *Vespa velutina nigrithorax*. *Vespa velutina* mainly lives in Indonesia. *Vespa velutina nigrithorax* has recently made an incursion into Tsushima and Kitakyushu city.

In particular, the target to be controlled by the present invention repellent is Vespinae, which is aggressive and dangerous. In addition, the target to be controlled by the present invention repellent is a female worker and a queen wasp, which works outside of a nest in early summer before a worker emerges from a pupa.

The Vespidae wasp repellent according to the present invention is characterized in comprising a compound represented by the following formula (I) as an active component.

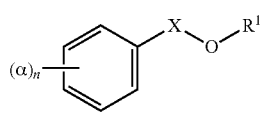

wherein
R$^1$ is a hydrogen atom, a C$_{1-4}$ alkyl group optionally having a substituent β, a C$_{2-4}$ alkenyl group optionally having a substituent β or a C$_{1-4}$ alkyl-carbonyl group optionally having a substituent β;

X is a C$_{1-4}$ alkylene group optionally having a substituent γ or a C$_{2-4}$ alkenylene group optionally having a substituent γ;

α is one or more substituents selected from a C$_{1-4}$ alkyl group optionally having a substituent δ, a C$_{2-4}$ alkenyl group optionally having a substituent δ, a C$_{1-4}$ alkoxy group optionally having a substituent δ, a C$_{1-4}$ alkyl-carbonyl group optionally having a substituent δ, a C$_{1-4}$ alkyl-carbonyloxy group optionally having a substituent δ, a halogeno group and a hydroxy group;

the substituent β, substituent γ and substituent δ are independently one or more substituent selected from the group essentially consisting of a C$_{1-4}$ alkoxy group, a C$_{1-4}$ alkyl-carbonyl group, a C$_{1-4}$ alkyl-carbonyloxy group, a halogeno group and a hydroxy group; and n is an integer of 0 or more and 5 or less.

Hereinafter, the compound represented by the formula (I) is abbreviated as "compound (I)".

The terms "C$_{1-4}$ alkyl" and "C$_{1-4}$ alkyl group" are a linear or branched monovalent saturated aliphatic hydrocarbon group having a carbon number of 1 or more and 4 or less, and are exemplified by methyl, ethyl, n-propyl, isopropyl, n-butyl, isobutyl, s-butyl and t-butyl, and are preferably a C$_{1-3}$ alkyl group, more preferably a C$_{1-2}$ alkyl group, most preferably methyl.

The term "C$_{2-4}$ alkenyl group" is a linear or branched monovalent unsaturated aliphatic hydrocarbon group of which carbon number is 2 or more and 4 or less and which has at least one carbon-carbon double bond, and is exemplified by ethenyl (vinyl), 1-propenyl, 2-propenyl (allyl), isopropenyl, 2-butenyl, 3-butenyl and isobutenyl, and is preferably ethenyl (vinyl) or 2-propenyl (allyl).

The term "C$_{1-4}$ alkylene group" is a linear or branched divalent saturated aliphatic hydrocarbon group having a carbon number of 1 or more and 4 or less, and is exemplified by methylene, methylmethylene, dimethylmethylene, ethylene, 1-methylethylene, 2-methylethylene, linear propylene, 1-methylpropylene, 2-methylpropylene, 3-methylpropylene and linear butylene, and is preferably a linear C$_{1-3}$ alkylene group or a branched C$_{1-4}$ alkylene group having a linear C$_{1-3}$ alkylene group, more preferably a linear C$_{1-3}$ alkylene group or a branched C$_{1-3}$ alkylene group having a linear C$_{1-2}$ alkylene group and methyl as a side chain substituent, most preferably methylene.

The term "C$_{2-4}$ alkenylene group" is a linear or branched divalent unsaturated aliphatic hydrocarbon group of which carbon number is 2 or more and 4 or less and which has at least one carbon-carbon double bond, and is exemplified by ethenylene (vinylene), 1-methylethenylene, 2-methylethenylene, 1-propenylene, 2-propenylene, 1-butenylene, 2-butenylene and 3-butenylene, and is preferably C$_{2-3}$ alkenylene group and more preferably 1-propenylene or 2-propenylene.

The term "C$_{1-4}$ alkoxy group" is a linear or branched aliphatic hydrocarbonoxy group having a carbon number of 1 or more and 4 or less, and is exemplified by methoxy, ethoxy, n-propoxy, isopropoxy, n-butoxy, isobutoxy, t-butoxy, n-pentoxy and n-hexoxy, and is preferably a C$_{1-2}$ alkoxy group and more preferably methoxy.

The term "halogeno group" is exemplified by fluoro, chloro, bromo and iodo, and is preferably chloro, bromo or iodo.

The phenyl group in the above-described general formula (I) may be substituted by 1 or more and 5 or less substituent α. The number of the substituent α, i.e., "n" is preferably an integer of not more than 3 or not more than 2, more preferably 0 or 1, and even more preferably 0. When n is an integer of 2 or more, a plurality of substituent α may be the same as or different from each other.

The number of substituent β, γ and δ as a substituent of an alkyl group or the like is not particularly restricted as long as the group can be substituted, and may be 1 or more and 5 or less, preferably not more than 4 or not more than 3, more preferably 1 or 2, and even more preferably 1. When the number of the substituent is 2 or more, a plurality of substituent β, γ and δ may be the same as or different from each other.

Since the compound (I) has a relatively simple chemical structure, if the compound (I) is commercially available, the commercial compound may be used, or a person skilled in the art can easily synthesize the compound (I) from a commercially available compound.

The Vespidae wasp repellent according to the present invention contains the compound (I) as an active component, and may contain a compound other than the compound (I) as long as the present invention repellent shows an effect to repel a Vespidae wasp.

For example, the compound (I) itself can be directly used as the Vespidae wasp repellent, since the compound (I) is basically in the form of a liquid under atmospheric temperature and atmospheric pressure, and the repellent having a higher concentration may exhibit a higher effect. On the one hand, when the compound (I) itself solidifies or a viscosity thereof becomes high at low temperature, the compound (I) may be dissolved in a solvent to be a solution. Such a solvent is exemplified by an alcohol solvent such as methanol, ethanol and isopropanol; a ketone solvent such as acetone and methyl ethyl ketone; an ether solvent such as diethyl ether and tetrahydrofuran; a polyol solvent such as ethylene glycol and glycerin; a liquid natural fat and oil, such as oregano oil, neem oil, thyme oil, clove oil, cinnamon oil, geranium oil, peppermint oil, lavender oil, anise oil and lime oil.

The liquid compound (I) under atmospheric temperature and atmospheric pressure and the solution of the compound (I) may be enclosed in a container with a high pressure gas such as methane, ethane, propane and butane to be a spray product by which the compound (I) can be sprayed.

The compound (I) may be mixed with a solidifying agent or a thickener to be in a state of a solid or a gel. Since the compound (I) is sustainedly released from such a solid product or gel product, a repellent action against a Vespidae wasp can be sustainedly maintained. The term "state of a solid" in the present invention does not mean a solid in a strict sense as long as the form is maintained under atmospheric temperature and atmospheric pressure, and with respect of the term "state of a gel", it is not problematic whether the gel can be dissolved or not in a solvent as long as the gel is an amorphous fluid having high viscosity.

The compound (I) may be encapsulated in a microcapsule. The microcapsule containing the compound (I) can sustainedly release the compound (I), may be incorporated in not only a solid product but also a liquid product and a gel product to be a sustainedly-releasable liquid product or gel product. The conformation of the microcapsule is not particularly restricted, and may be any one of mononuclear type, polynuclear type and matrix type depending on a desired sustained release period. A method for encapsulating the compound (I) to be in a state of a microcapsule is exemplified by a chemical method using polyurea, polyurethane, polyamide, melamine resin, urea resin, calcium alginate or the like; a physicochemical method using gelatin, gum arabic, a polymer dissolved in a low-boiling organic solvent, or the like; a mechanical and physical method using a dried coating polymer, gelatin, starch, wax, polyvinyl alcohol, polyethylene or the like.

The solidifying agent to solidify the repellent of the present invention is exemplified by agar; gelatin; a thickening polysaccharide such as xanthan gum, alginate salt and carrageenan; polyethylene glycol having an average molecular weight of about 3,000 or more and about 25,000 or less; a cellulose derivative such as hydroxyethyl cellulose and carboxymethyl cellulose salt; polyvinyl alcohol; polyvinyl pyrrolidone.

The gelator to gelate the repellent of the present invention is exemplified by a high concentration aqueous solution of the above-described solidifying agent; polyethylene glycol having an average molecular weight of about 1,000 or more and about 2,000 or less.

In the repellent of the present invention, a general additive such as a preservative, an antioxidant and a coloring agent may be incorporated.

In the repellent of the present invention, a pyrethroid-based insecticidal ingredient, which is an active component of a general insecticide for a wasp, may be incorporated. Some conventional insecticides for a wasp have the ability to kill a Vespidae wasp but it is not always possible to promptly take away the aggression or paralyze the nervous system by a conventional insecticide for a wasp, and there is a risk that a user would continue to be attacked until an insecticide shows action. On the one hand, the compound (I) of the present invention can promptly take away the aggression of a Vespidae wasp; however, as long as the inventors of the present invention experimentally confirm, the compound (I) may not have the ability to kill a Vespidae wasp. Accordingly, by incorporating a pyrethroid-based insecticidal ingredient which is useful against a Vespidae wasp in the repellent of the present invention, the aggression of a Vespidae wasp can be promptly taken away and further a Vespidae wasp can be killed. Such a pyrethroid-based insecticidal ingredient is not particularly restricted as long as the ingredient is effective against a Vespidae wasp, and is exemplified by a pyrethrum extract; a natural pyrethroid such as pyrethrin, cinerine and jasmorin; a synthetic pyrethroid such as prallethrin, allethrin, tetramethrin, resmethrin, furamethrin, phenothrin, permethrin, cyphenothrin, veratrine, etofenprox, cyfluthrin, tefluthrin, bifenthrin, silafluofen, transfluthrin, phthalthrin, metofluthrin, momfluorothrin, etofenprox, profluthrin and cyfluthrin. Among the examples, the pyrethroid-based insecticidal ingredient is preferably at least one selected from the group essentially consisting of metofluthrin, prallethrin, momfluorothrin, resmethrin, phthalthrin, etofenprox, cyphenothrin, profluthrin, cyfluthrin and tetramethrin.

A concentration of the compound (I) in the repellent of the present invention may be appropriately adjusted as long as an action to repel a Vespidae wasp is exhibited, and may be preferably adjusted to 1 mass % or more. When the concentration is 1 mass % or more, an action to repel a Vespidae wasp is exhibited more surely. The concentration is more preferably 5 mass % or more and even more preferably 10 mass % or more. On the one hand, the upper limit of the concentration is not particularly restricted and the concentration may be 100 mass %.

When a pyrethroid-based insecticidal ingredient which is effective against a Vespidae wasp is incorporated in the repellent of the present invention, a concentration of a pyrethroid-based insecticidal ingredient in the whole repellent may be adjusted to 0.01 mass % or more and 10.0 mass % or less and is preferably 0.02 mass % or more and 2.0 mass % or less.

Patent document 3 discloses the data which demonstrates that a composition containing phenethyl alcohol (phenylethanol) has an action to attract *Vespa mandarinia* and *Vespa simillima xanthoptera*. Although the reason why the composition show such an action is not necessarily clear, it is conceivable as the reason that the composition contains a fatty acid ethyl ester having an attracting action on a Vespidae wasp as a main component. It is therefore preferred that the repellent of the present invention does not contain a fatty acid ethyl ester, which is described as a component having an ability to attract a hornet in Patent document 3, such as ethyl lactate, ethyl hexanoate, ethyl octanoate, ethyl nonanoate, ethyl decanoate, ethyl anthranilate, ethyl undecanoate, ethyl dodecanoate, ethyl myristate and ethyl palmitate. It is considered to be a fact that at least 2-phenylethanol has an action to repel a Vespidae wasp on the basis of the experimental finding by the inventors of the present invention and the experimental data described in Patent document 3 to demonstrate that the action to attract a Vespidae wasp of the specific composition is inferior to that of a fermentation juice as a control.

The repellent of the present invention has an action to repel a Vespidae wasp. Specifically, the present invention repellent causes a flapping behavior which is considered to be conducted for avoiding the present invention compound (I) perceived as a smell with arthropod antennae and then a flying behavior for an escape, or an immediate flying behavior for an escape. Even if a Vespinae wasp which shows strong aggression is stimulated during such a flapping behavior, the wasp does not show attack behavior and continues a flapping behavior or flies away. Accordingly, for example, even if a person is attacked by a group of a Vespidae wasp in a forest, the aggression can be immediately lost by spraying the liquid repellent of the present invention against the Vespidae wasp or to an exposed skin part from a brought sprayer into which the liquid repellent is enclosed. Thus, the liquid present invention repellent is a more effective countermeasure in comparison with a conventional general insecticide. In addition, the present invention repellent is useful for suppressing the aggression of a Vespidae wasp, when a nest of a Vespidae wasp is removed and a group of a Vespidae wasp attacks a nest of an Apidae bee.

It is confirmed by an experimental finding by the inventors of the present invention that when the present invention repellent is close to a juice containing a sugar component, which attracts a Vespidae wasp, a Vespidae wasp does not come close to the juice. Accordingly, it is possible to continuously prevent a Vespidae wasp from coming close and building a nest by placing the solid present invention repellent or applying the liquid present invention repellent containing the gelled or microencapsulated compound (I) on a place such as a private house where a Vespidae wasp should be prevented from coming close and building a nest to sustainedly release the compound (I).

It is experimentally confirmed that the repellent of the present invention is harmless against an Apidae bee. It is therefore possible to continuously protect a nest of an Apidae bee from an access and attack by a Vespidae wasp by spraying, placing or applying the present invention repellent on a nest box, a nest itself of an Apidae bee or the surrounding area thereof.

The present application claims the benefit of the priority date of Japanese patent application No. 2015-221379 filed on Nov. 11, 2015. All of the contents of the Japanese patent application No. 2015-221379 filed on Nov. 11, 2015, are incorporated by reference herein.

EXAMPLES

Hereinafter, the examples are described to demonstrate the present invention more specifically, but the present invention is in no way restricted by the examples, and the examples can be appropriately modified to be carried out within a range which adapts to the contents of this specification. Such a modified example is also included in the range of the present invention.

Example 1: Response of *Vespa mandarinia* Worker During Sap Collection to Sprayed Benzyl Alcohol and Analog Thereof The experiment was conducted on a *Vespa mandarinia japonica* Radoszkowski worker which flew to a sawthorn oak tree bleeding sap and which collected the sap in Kagawa Prefecture Kinbuchi Forest Park in Takamatsu City Kagawa Prefecture from June to October, 2014 and from June to July, 2015.

Specifically, 100 mL of distilled water was enclosed in a plastic sprayer having a volume of 200 mL to be used as a control sprayer, and 100 mL of benzyl alcohol was enclosed in the same material and the same volume sprayer to be used as a test liquid sprayer. First, distilled water was sprayed one time to one *Vespa mandarinia* worker which was collecting sap at a sap bleeding part of a trunk of a sawthorn oak tree by using a control sprayer. Distilled water was sprayed to 10 workers totally, and the behavior of the workers were observed for 1 minute. Then, benzyl alcohol was sprayed one time by using a test liquid sprayer. Next, the workers were observed up to 1 minute. With respect to 2-phenylethanol, 3-phenylpropanol, 1-phenyl-2-prpanol and benzyl acetate, the spray test to a *Vespa mandarinia* worker collecting a sawthorn oak sap was conducted in the same condition. The result is shown in Table 1.

TABLE 1

|  | Number of worker | |
| --- | --- | --- |
|  | No response | Effective |
| Distilled water | 10/10 | 0/10 |
| Benzyl alcohol | 0/10 | 10/10 |
| 2-Phenylethanol | 0/10 | 10/10 |
| 3-Phenylpropanol | 0/10 | 10/10 |
| 1-Phenyl-2-propanol | 0/10 | 10/10 |
| Benzyl acetate | 0/10 | 10/10 |

As shown in Table 1, when distilled water as a control was sprayed on each individual *Vespa mandarinia* worker, a noticeable change in behavior of each individual could not observed and each individual continued to collect sap at a sap bleeding part similarly to before the spray. Then, when benzyl alcohol, 2-phenylethanol, 3-phenylpropanol, 1-phenyl-2-propanol or benzyl acetate was sprayed, any 10 workers immediately started flapping, and at about the same time or a few seconds later, the workers flew away from the sap bleeding part. Such a flapping behavior is considered to be an action to avoid each test liquid sensed as a smell by arthropod antennae.

McNemar test was conducted for the presence or absence of response between distilled water and each test liquid; as a result, there was a significant difference at $p<0.01$. Immediately after the above-described each test liquid was sprayed, some workers flew to and alighted on the body of the experimenter within 1 m of the sprayed worker, but there was no worker which attacked with a venomous sting.

It was confirmed from the above result that all of the five test liquids exhibit a strong repelling action against a *Vespa mandarinia* worker and also have an action to suppress the aggression.

Example 2: Effect of 2-Phenylethanol and Benzyl Alcohol on Aggression of *Vespa mandarinia* Worker Around Nesting Place (1) Experiment 1

The experiment was conducted with utilizing a nest of *Vespa mandarinia* found in Kagawa Prefecture Kinbuchi Forest Park in Takamatsu City Kagawa Prefecture on Oct.

24, 2014. Since the nest was built in the ground, the nest could not be found except for the entrance thereof.

A vinyl ball of which diameter was 13 cm and which was coated with black lacquer was hung on the tip of a fishing rod having a length of 11 m. Hereinafter, the ball was abbreviated as "black ball". After distilled water was sprayed on the entire surface, the vicinity of the nest entrance was disturbed by using the black ball. Specifically, the nest was disturbed by vibrating the black ball about 50 cm before the nest entrance in the air for about 10 seconds or vibrating the black ball in contact with the nest entrance for about 10 seconds. After the black ball was vibrated in the above-described conditions for about 10 seconds, the black ball was moved to the air of about 1 m before the nest entrance, and the behavior of the *Vespa mandarinia* worker against the black ball was shot and recorded for 2 minutes with a video camera. In the above condition, both of the black balls used in both conditions were attacked by the *Vespa mandarinia* workers and it is considered that the alarm pheromone was adsorbed on the black balls. Then, the black ball was kept away from the nest so that all the *Vespa mandarinia* workers were separated, 2-phenylethanol was sprayed on the entire surface, and the behavior of the workers against the black ball was similarly observed. The total number of workers alighting on the surface of the hemispherical side observable by the video image for attack during the vibration of the black ball was counted. The number is shown in Table 2.

TABLE 2

| Disturbance condition by black ball | Distilled water | 2-Phenylethanol |
|---|---|---|
| Vibration in the air before nest entrance | 12 | 0 |
| Vibration in contact with nest entrance | 21 | 0 |

In both of the cases where the black ball on which distilled water was sprayed was vibrated before the nest entrance and the black ball was vibrated in contact with the nest entrance, the worker which flew to and alighted on the ball for attack was observed and the total number of the worker of the latter case was larger than that of the former case. It has been known that when a Vespidae wasp worker attacks to a foreign enemy, the worker not only sticks a venomous sting but also deposits alarm pheromone, which functions as an indicator of attack. Thus, many workers intensively attack to the enemy with alarm pheromone. Since alarm pheromone was surely adsorbed on the black ball used as a control in this experiment by the worker's attack, the black ball was supposed to be attacked by the workers more easily than a new black ball. On the one hand, when 2-phenylethanol was sprayed on the surface of the black ball on which alarm pheromone was adsorbed and the nest was disturbed in both of the above-described conditions, the worker which flew closer to the black ball was observed but all of the workers changed the direction at a distance of about 10 cm from the surface of the black ball and flew away, and finally the black ball was not attacked by the worker at all.

From the above experimental result, it was confirmed that 2-phenylethanol not only functions as a substance to repel a Vespidae wasp worker but also functions as a substance to curb aggression by disabling the effect of alarm pheromone, which strongly attracts homogeneous worker and induces aggressive behavior.

(2) Experiment 2

In the above-described Experiment 1, it was observed that vibrating the black ball in contact with the nest entrance more strongly induces the attack behavior of the worker rather than vibrating the black ball in the air away from the nest. Accordingly, the attack situation of the worker was investigated by vibrating the black ball in contact with the entrance of the same Vespidae wasp nest used in the above-described Experiment 1 for 30 seconds on Oct. 31, 2014. Specifically, the attack situation of the worker was observed similarly to the above-described Experiment 1 except for using a new black ball without using the black ball on which alarm pheromone was adsorbed even in the case of the test liquid and using 2-phenylethanol or benzyl alcohol as the test liquid by vibrating the black ball in contact with the entrance of the same nest for 30 seconds.

As a result, in the case of the black ball on which distilled water was sprayed, it was difficult to count the total number of the workers which flew to and alighted on the black ball for attack, since the black ball was continued to be attacked by the workers for 150 seconds from the end of the vibration almost without interruption and the number of attacking worker was clearly larger in comparison with the case of the above-described Experiment 1. The inventors therefore counted the number of the worker which could be observed on the hemispherical surface of the black ball from the video image at intervals of 30 seconds from the end of the disturbance. The result is shown in Table 3. In addition, a picture of the video footage 145 seconds after the end of the nest entrance disturbance is shown as FIG. 1. FIG. 1A is an image of the case where distilled water was used, FIG. 1B is an image of the case where 2-phenylethanol was used, and FIG. 1C is an image of the case where benzyl alcohol was used.

TABLE 3

| Elapsed time after disturbance | Distilled water | 2-Phenylethanol | Benzyl alcohol |
|---|---|---|---|
| 30 s | 1 | 0 | 0 |
| 60 s | 0 | 0 | 0 |
| 90 s | 3 | 0 | 0 |
| 120 s | 3 | 0 | 0 |
| 150 s | 2 | 0 | 0 |

In the white circle in FIG. 1A, 6 workers flying to and alighting on the hemispherical side of the black ball for attack are recognized. After the end of the experimental period, attack against the black ball did not stop even when the rod was separated from the nest by more than 5 m, and the experimenter who separated from the nest by 8 m or more and did not move was also attacked by the workers which flew rush to the experimenter.

On the one hand, when 2-phenylethanol or benzyl alcohol was sprayed overall of the black ball, no worker which flew to and alighted on the black ball for attack was observed during the 150 second experimental period despite strengthening the disturbance of the nest entrance. In FIG. 1B, one worker within the white circle immediately before flying away while changing the direction of flying and coming close to the black ball was recognized. In FIG. 1C, a similar one worker and 5 workers which flew away to the nest entrance were recognized in the white circle. Statistically, the attacking worker number against the black ball was significantly smaller when using 2-phenylethanol and benzyl alcohol than the case of the control using distilled water at $p<0.05$ by t-test.

From the above result, it was found that the repellent effect of 2-phenylethanol and benzyl alcohol on a *Vespa mandarinia* worker is very strong.

Example 3: Effect of 2-Phenylethanol and Benzyl Alcohol on Aggression of *Vespa simillima Xanthoptera* Cameron Worker Around Nesting Place (1) Experiment 1

The experiment was also conducted with utilizing a nest of *Vespa simillima xanthoptera* Cameron in Kagawa Prefecture Kinbuchi Forest Park in Takamatsu City Kagawa Prefecture on Oct. 24, 2014. Since the nest was also built in the ground, the nest could not be found except for the entrance thereof.

As the above-described Example 2(1), the nest entrance was disturbed by vibrating the black ball in contact with the nest entrance for about 10 seconds. The total number of attacking worker could not be counted, since the number of the worker which attacked to the control black ball using distilled water was much larger than that of the control in the experiment for *Vespa mandarinia* and the worker moved very rapidly. Thus, the video image was stopped every 30 seconds from the end of the nest entrance disturbance and the number of the worker which alighted on the hemispherical surface of the black ball for attack was counted. The result is shown in Table 4. During 120 seconds for the experiment, the workers continued to strongly attack to the black ball as the workers constantly flew to and alighted on the black ball for attack and the worker number was not decreased. Such an attack was continued even after the end of the experiment at which the tip of the rod was moved to a place 5 m or more away from the nest, and the attack was finally not observed after about 20 minutes passed from the experiment was finished. Then, 2-phenylethanol was sprayed on the black ball to which *Vespa simillima xanthoptera* attacked as the test liquid example and the nest entrance was disturbed using the black ball. Although the worker which tried to come close to the black ball was observed, even the closest worker changed the direction in the air 10 to 20 cm from the surface of the black ball and flew away, and no worker which flew to and alighted on the surface of the black ball was found.

TABLE 4

| Elapsed time after disturbance | Distilled water | 2-Phenylethanol |
|---|---|---|
| 30 s | 9 | 0 |
| 60 s | 7 | 0 |
| 90 s | 7 | 0 |
| 120 s | 9 | 0 |

From the above experimental result, also in the case of *Vespa simillima xanthoptera* Cameron, it was confirmed that 2-phenylethanol not only functions as a substance to repel a worker but also functions as a substance to curb aggression by disabling the effect of alarm pheromone, which strongly attracts homogeneous worker and induces aggressive behavior.

(2) Experiment 2

Figure 2:
FIG. 2 are images of a video footage which records the attack situation against a black ball when stimulating the nest of *Vespa simillima xanthoptera* with the black ball on which a test liquid is sprayed.
Figure 2:
Figure 2:
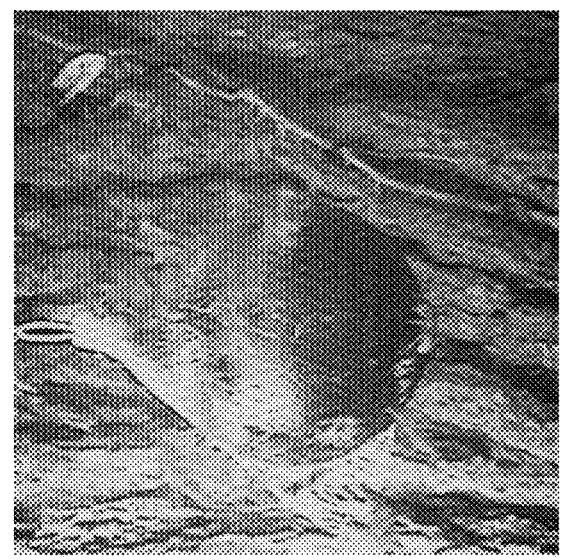

A similar experiment to the above-described Example 2(2) was conducted against the same *Vespa simillima xanthoptera* nest of the above-described Experiment 1 on Oct. 31, 2014. The number of worker on the black spherical hemispherical surface counted every 30 seconds on the basis of the video image is shown in Table 5, and the picture of the video footage after 115 seconds is shown as FIG. 2. FIG. 2A is an image of the case where distilled water was used, FIG. 2B is an image of the case where 2-phenylethanol was used, and FIG. 2C is an image of the case where benzyl alcohol was used.

TABLE 5

| Elapsed time after disturbance | Distilled water | 2-Phenylethanol | Benzyl alcohol |
|---|---|---|---|
| 30 s | 8 | 1 | 0 |
| 60 s | 7 | 0 | 0 |
| 90 s | 3 | 0 | 0 |
| 120 s | 3 | 0 | 0 |
| 150 s | 5 | 0 | 0 |

Similarly to the control example of the above-described Experiment 1, the control black ball was continued to be violently attacked by the worker and the number of the worker which attacked to the black ball was not decreased for 150 seconds of the experiment. In FIG. 2A, at least 3 workers which flew to and was about to alight on the black ball were observed in addition to 7 workers which flew to and alighted on the black ball for attack. On the one hand, in the case where 2-phenylethanol or benzyl alcohol was used, although the nest entrance was strongly disturbed similarly to the case of *Vespa mandarinia*, only one worker alighted on the black ball on which 2-phenylethanol was sprayed 30 seconds after from the end of the nest disturbance. The situation like the two pictures of FIG. 2B and FIG. 2C in which no worker flew and came close to the black ball could be shown was observed throughout the experiment period. Statistically, the attacking worker numbers against the black balls were significantly smaller when using 2-phenylethanol and benzyl alcohol than the control example at respectively $p<0.01$ and $p<0.001$ by t-test.

From the above result, it was found that the repellent effect and the action to suppress the aggression of 2-phenylethanol and benzyl alcohol on *Vespa simillima xanthoptera* worker is strong equivalent to or higher than the repellent effect on *Vespa mandarinia*.

Example 4: Effect of 2-Phenylethanol and Benzyl Alcohol on Aggression of *Vespa analis insularis* (Fabricius) Worker Around Nesting Place The experiment was conducted with utilizing a nest of *Vespa analis insularis* (Fabricius) built under an awning of a private house in Iida-cho Takamatsu City on Sep. 9, 2015.

(1) Experiment 1

Figure 3:
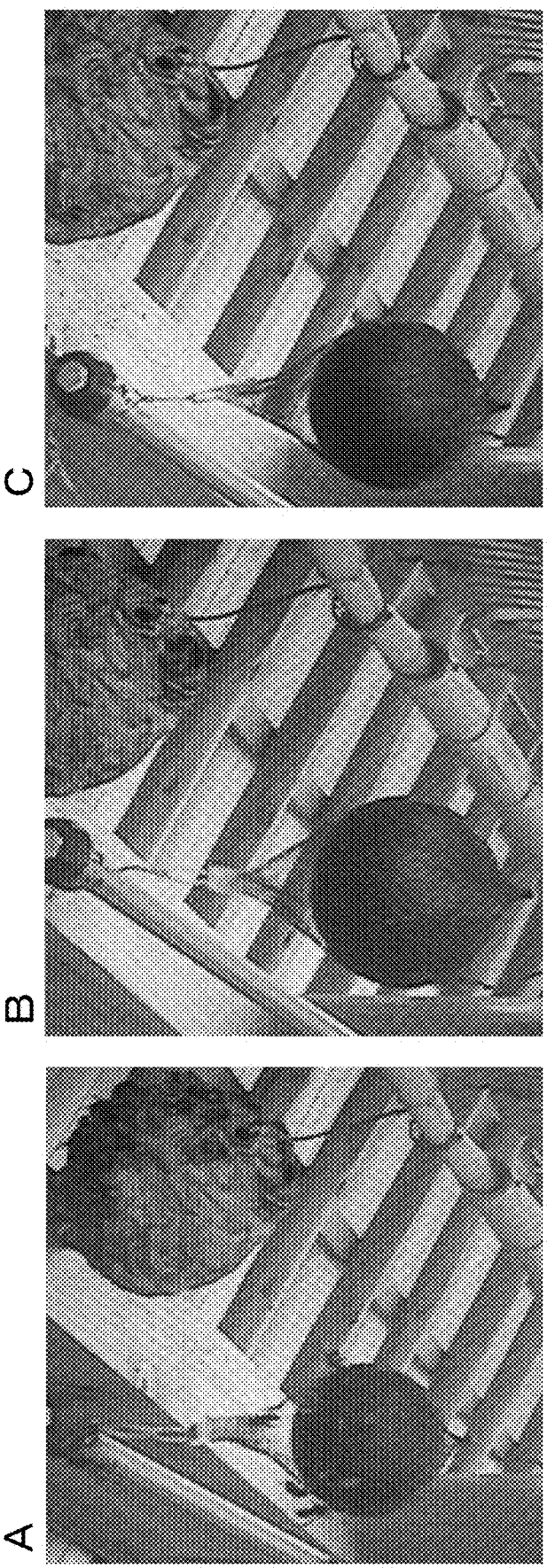
FIG. 3 are images of a video footage which records the attack situation against a black ball when stimulating the nest of *Vespa analis* with the black ball on which a test liquid is sprayed.

A black ball was hung on the tip of a fishing rod having a length of 11 m, and distilled water was sprayed on the entire surface of the black ball. While the surface of the nest was tapped with the tip of the fishing rod once every about 10 seconds, the worker's action against the black ball was taken and recorded with a video camera for 5 minutes. When the nest was hit, the black ball was in close proximity to the nest as the black ball was about to touch the nest, and when the nest was not hit, the black ball was kept still in the air about 50 cm away from the nest surface. The thus recorded video footage was replayed, and the number of worker which flew to and alighted on the hemisphere surface of the black ball for attack was counted. Similar experiments were conducted with respect to the black ball prepared by spraying benzyl alcohol on the entire surface of a new black ball as "Test liquid example 1" and the black ball prepared by spraying benzyl alcohol on the entire surface of the control example black ball on which alarm pheromone was adsorbed by the worker's attack as "Test liquid example 2". The result is shown in Table 6. In addition, a picture of the video footage 234 seconds after the start of the nest disturbance is shown as FIG. 3. FIG. 3A is an image of the control example that distilled water was used, FIG. 3B is an image of the Test liquid example 1, and FIG. 3C is an image of the Test liquid example 2.

TABLE 6

| Elapsed time after disturbance | Distilled water | Test liquid 1 | Test liquid 2 |
|---|---|---|---|
| 30 s | 4 | 0 | 0 |
| 60 s | 6 | 0 | 1 |
| 90 s | 6 | 2 | 0 |
| 120 s | 7 | 1 | 0 |
| 150 s | 4 | 0 | 0 |
| 180 s | 7 | 0 | 0 |
| 210 s | 5 | 0 | 0 |
| 240 s | 4 | 0 | 0 |
| 270 s | 7 | 0 | 0 |
| 300 s | 5 | 0 | 0 |

As shown in FIG. 3A, the control black ball prepared by spraying distilled water on a new black ball was continued to be attacked by the workers for 300 seconds of the experiment without a break. On the one hand, as FIG. 3B, FIG. 3C and Table 6, in both of the cases of Test liquid example 1 in which benzyl alcohol was sprayed on a new black ball and the Test liquid example 2 in which benzyl alcohol was sprayed on the black ball on which alarm pheromone was adsorbed by many workers' attack in the prior control example, although it was found that the worker sometimes attacked to the black ball, the frequency of the attack was much less than the control example and the number of the attacking worker was significantly smaller than the control example at p<0.05 by t-test. In addition, the number of many workers which come out all at once from the nest to the nest surface by the physical stimulus of intermittently hitting the nest during the control example was continuously decreased during the Test liquid example 1 and Test liquid example 2 conducted immediately after the control example, although the number of the workers was not recorded. At the end of the experiment, there was only one worker which could not fly due to a defect of the wings on the surface.

From the above result, it was found that benzyl alcohol has the effect to suppress the aggressive behavior and the strong repellent effect on the worker of not only *Vespa mandarinia* and *Vespa simillima xanthoptera* but also *Vespa analis insularis* (Fabricius).

(2) Experiment 2

The inventors investigated the worker's philopatry and homing circumstance to the nest as follows. After the above-described experiment 1, benzyl alcohol was intermittently sprayed three times on the entire surface of the same nest of *Vespa analis insularis* (Fabricius) by using a sprayer equipped with a nozzle having a length of 1.5 m. An adult wasp on the nest surface, worker entering and leaving the nest holes and worker coming close to the nest were shot with a video camera. The experiment was started at 14:01:30 and finished at 14:10. The numbers of the adult wasp on the nest surface and in the nest were counted immediately after the experiment. The number of adult wasp in the nest was counted by inserting the whole nest in a paper bag, sealing the paper bag, and then deconstructing the nest. The result is shown in Table 7.

TABLE 7

| Clock time | 14:01:30 | 14:02:20 | 14:04:30 | 14:10:00 |
|---|---|---|---|---|
| Sprayed benzyl alcohol | ↓ | ↓ | ↓ | |
| Flew away from nest | 15 | 10 | 2 | |
| Entered nest | 5 | 0 | 0 | |
| Flew to and alighted on nest surface and then flew away | 1 | 2 | 4 | |
| Flew to and came close to nest surface and then flew away | 2 | 6 | 55 | |

Immediately after benzyl alcohol was first sprayed, 15 workers came out one after another from the gateway of the nest but any workers flew out from the nest without staying even for a moment on the surface of the nest. In addition, 5 of 6 workers which landed around the nest entrance returned into the nest from the nest entrance. Immediately after benzyl alcohol was secondly sprayed, further 10 workers came out of the gateway of the nest but also flew out and got away from the nest without staying. During 5 minutes and 30 seconds from the third spray of benzyl alcohol to the end of the experiment, 2 workers flew out from the nest and directly got away from the nest. In addition, 59 workers of the workers which were flying around the nest came close to the nest surface, but only 4 of the workers alighted on the nest surface. The 4 workers stayed on the nest surface only for a moment and got away from the nest, and no worker entered the nest from the nest gateway after second spraying. All of the adult wasps got away from the nest at the end of the experiment of 14:10, and there were only pupae, pre-pupae, larvae and eggs in each nest room of the nest. Since the queen wasp could not be found in the nest, the queen wasp might be counted as one worker which got away.

Example 5: Evaluation of Repellent Effect and Sustainability of 2-Phenylethanol Against Vespidae Worker by Using Attraction Trap Set in the Outside The inventors conducted the experiment at four places in Kagawa Prefecture Kinbuchi Forest Park. The experiment was conducted totally 4 times from Oct. 11 to Nov. 4, 2013, from Nov. 4 to Dec. 7, 2013, from Oct. 1 to Oct. 31, 2014, and from Oct. 31 to Dec. 9, 2014.

Figure 4:
FIG. 4 is a photograph to show the installation state of the attraction trap used in Example 5 described later using the hornet attraction trap.

First, four 2 cm square holes were opened on the side of a 2 L capacity PET bottle, and 500 mL of grape juice was added thereto to prepare a control attraction trap to kill a Vespidae worker. As Test liquid example, 25 mL, 5 mL or 1 mL of 2-phenylethanol was added to the grape juice of the traps. As shown in FIG. 4, one test liquid example trap was certainly placed in the nearest place of one control example trap to make one pair of both example traps, and the numbers of control example traps and test liquid example traps at each test site were respectively adjusted to 5 in order to minimize the difference in environmental conditions between the control example and the test liquid example. Since all of the test sites were low mountainous and sloping areas and had many trees, each trap had to be suspended from the branch of live trees. As a result, the horizontal distances between a pair of control example trap and test liquid example trap could not be adjusted to the same, and the distance was from 1 m to 8.5 m. There were not only Vespidae worker but also male Vespidae among the killed Vespidae wasps in the attraction traps; however, the results of the control example and test liquid example were compared on the basis of the number of the killed Vespidae worker, since a Vespidae worker causes a stabbing accident and plays an important role in building a nest. The number of the installed traps and the number of the trap by which a Vespidae worker was killed are shown in Table 8. In Table 8, "*" indicates the case where there is a significant difference at $p<0.01$ in the $\chi^2$ test to which the correction of Yates is applied, and "**" indicates the case where there is a significant difference at $p<0.001$ in the same test. The result of the first experiment in 2013 is shown in Table 9, the result of the second experiment in 2013 is shown in Table 10, the result of the first experiment using 1% 2-phenylethanol in 2014 is shown in Table 11, the result of the second experiment in 2014 is shown in Table 12, the result of the first experiment using 0.1% 2-phenylethanol in 2014 is shown in Table 13, and the result of the second experiment in 2014 is shown in Table 14. In Tables 9 to 14, "*" indicates the case where there is a significant difference at $p<0.05$ in the t-test, "" indicates the case where there is a significant difference at $p<0.01$ in the same test, and "*" indicates the case where there is a significant difference at $p<0.001$ in the same test.

TABLE 8

| Experiment year | Experiment example | Number of installed trap | Number of effective trap | |
|---|---|---|---|---|
| | | | $1^{st}$ experiment | $2^{nd}$ experimant |
| 2013 | control | 18 | 18** | 9* |
| | 5% 2-phenylethanol | 18 | 0 | 0 |
| 2014 | control | 10 | 9** | 3 |
| | 1% 2-phenylethanol | 10 | 0 | 0 |
| 2014 | control | 10 | 10 | 0 |
| | 0.1% 2-phenylethanol | 10 | 10 | 1 |

TABLE 9

| | | Total number of killed worker (Average ± SD) | | | | | |
|---|---|---|---|---|---|---|---|
| Experiment example | Trap number | All species | Vespa mandarinia | Vespa crabro flavofasciata | Vespa ducalis | Vespa analis | Vespa simillima xanthoptera |
| Control | 18 | 108 | 58 | 14 | 6 | 30 | 0 |
| | | (6.00 ± 6.07) | (3.22 ± 3.64) | (0.78 ± 0.88) | (0.33 ± 0.84) | (1.67 ± 1.97) | (0.00 ± 0.00) |
| Test liquid | 18 | 0 | 0 | 0 | 0 | 0 | 0 |
| | | (0.00 ± 0.00) | (0.00 ± 0.00) | (0.00 ± 0.00) | (0.00 ± 0.00) | (0.00 ± 0.00) | (0.00 ± 0.00) |
| t value | | 4.1949*** | 3.7568*** | 3.7575*** | 1.6833 | 3.5887** | 65535 |

TABLE 10

| | | Total number of killed worker (Average ± SD) | | | | | |
|---|---|---|---|---|---|---|---|
| Experiment example | Trap number | All species | Vespa mandarinia | Vespa crabro flavofasciata | Vespa ducalis | Vespa analis | Vespa simillima xanthoptera |
| Control | 18 | 12 | 8 | 2 | 0 | 1 | 1 |
| | | (0.67 ± 0.84) | (0.45 ± 0.62) | (0.11 ± 0.33) | (0.00 ± 0.00) | (0.06 ± 0.24) | (0.06 ± 0.24) |
| Test liquid | 18 | 0 | 0 | 0 | 0 | 0 | 0 |
| | | (0.00 ± 0.00) | (0.00 ± 0.00) | (0.00 ± 0.00) | (0.00 ± 0.00) | (0.00 ± 0.00) | (0.00 ± 0.00) |
| t value | | 3.3665** | 3.0626** | 1.4577 | 65535 | 1 | 1 |

TABLE 11

| Experiment example | Trap number | Total number of killed worker (Average ± SD) | | | | | |
|---|---|---|---|---|---|---|---|
| | | All species | Vespa mandarinia | Vespa crabro flavofasciata | Vespa ducalis | Vespa analis | Vespa simillima xanthoptera |
| Control | 10 | 33 (3.30 ± 2.58) | 16 (1.60 ± 1.90) | 7 (0.70 ± 1.06) | 6 (0.60 ± 0.70) | 3 (0.30 ± 0.67) | 1 (0.10 ± 0.32) |
| Test liquid | 10 | 0 (0.00 ± 0.00) | 0 (0.00 ± 0.00) | 0 (0.00 ± 0.00) | 0 (0.00 ± 0.00) | 0 (0.00 ± 0.00) | 0 (0.00 ± 0.00) |
| t value | | 4.0830** | 2.6667* | 2.0896 | 2.7136* | 1.4056 | 1 |

TABLE 12

| Experiment example | Trap number | Total number of killed worker (Average ± SD) | | | | | |
|---|---|---|---|---|---|---|---|
| | | All species | Vespa mandarinia | Vespa crabro flavofasciata | Vespa ducalis | Vespa analis | Vespa simillima xanthoptera |
| Control | 10 | 4 (0.40 ± 0.70) | 3 (0.30 ± 0.67) | 1 (0.10 ± 0.32) | 0 (0.00 ± 0.00) | 0 (0.00 ± 0.00) | 0 (0.00 ± 0.00) |
| Test liquid | 10 | 0 (0.00 ± 0.00) | 0 (0.00 ± 0.00) | 0 (0.00 ± 0.00) | 0 (0.00 ± 0.00) | 0 (0.00 ± 0.00) | 0 (0.00 ± 0.00) |
| t value | | 1.8091 | 1.4056 | 1 | 65535 | 65535 | 65535 |

TABLE 13

| Experiment example | Trap number | Total number of killed worker (Average ± SD) | | | | | |
|---|---|---|---|---|---|---|---|
| | | All species | Vespa mandarinia | Vespa crabro flavofasciata | Vespa ducalis | Vespa analis | Vespa simillima xanthoptera |
| Control | 10 | 112 (11.20 ± 7.42) | 56 (5.60 ± 7.50) | 38 (3.80 ± 1.75) | 5 (0.50 ± 0.85) | 13 (1.30 ± 1.84) | 0 (0.00 ± 0.00) |
| Test liquid | 10 | 62 (6.20 ± 6.27) | 36 (3.60 ± 5.58) | 15 (1.50 ± 1.27) | 4 (0.40 ± 0.70) | 6 (0.60 ± 0.70) | 1 (0.10 ± 0.32) |
| t value | | 1.6277 | 0.6764 | 3.3629** | 0.2873 | 1.2439 | −1 |

TABLE 14

| Experiment example | Trap number | Total number of killed worker (Average ± SD) | | | | | |
|---|---|---|---|---|---|---|---|
| | | All species | Vespa mandarinia | Vespa crabro flavofasciata | Vespa ducalis | Vespa analis | Vespa simillima xanthoptera |
| Control | 10 | 0 (0.00 ± 0.00) | 0 (0.00 ± 0.00) | 0 (0.00 ± 0.00) | 0 (0.00 ± 0.00) | 0 (0.00 ± 0.00) | 0 (0.00 ± 0.00) |
| Test liquid | 10 | 3 (0.30 ± 0.95) | 3 (0.30 ± 0.95) | 0 (0.00 ± 0.00) | 0 (0.00 ± 0.00) | 0 (0.00 ± 0.00) | 0 (0.00 ± 0.00) |
| t value | | −1 | −1 | 65535 | 65535 | 65535 | 65535 |

Result of Experiment in 2013

In the first experiment and second experiment, the trap prepared by adding 25 mL of 2-phenylethanol to 500 mL of grape juice was used as the test liquid example of 5% 2-phenylethanol.

As the result of the first experiment, 4 species except for *V. simillima xanthoptera* among 5 species in the genus *Vespa* which are known to inhabit Kagawa prefecture were killed by the control trap, in other words, Vespidae wasp workers of *V. mandarinia*, *V. crabro flavofasciata* Cameron, *V. ducalis pulchra* Buysson and *V. analis* were killed. In addition, at least one to at most 4 Vespidae wasp workers were killed in 18 control example traps except for 2 traps from which grape juice was lost due to unknown accident during the experiment. On the one hand, there was no trap in which a Vespidae wasp worker was killed in 18 test liquid example traps close to the control traps without the above accident, and the number of the test liquid example traps in which a Vespidae wasp worker was killed was significantly smaller at p<0.001. The number of the test liquid example trap in which a Vespidae wasp worker was killed (average: 0, SD: 0) was significantly smaller at p<0.001 than that of the control example traps (average: 6.00, SD: 6.07).

The period of the second experiment was overlapped with the end of the activity period of a Vespidae wasp, but 4 kinds of a Vespidae wasp except for *Vespa ducalis* were killed by the control example trap. However, the number of the trap by which at least one kind of a Vespidae wasp worker was killed was decreased to 9 among 18 control example traps, which corresponds to a half of the number in the first experiment, and the number of the a Vespidae wasp worker killed by each control example trap (average: 0.67, SD: 0.84) was much smaller than that of the number of the killed Vespidae wasp worker in the first experiment (average: 6.00, SD: 0.84). On the one hand, there was no trap by which a Vespidae wasp worker was killed in the test liquid example traps similarly to the first experiment. Thus, the number of the test liquid example trap by which a Vespidae wasp worker was killed was significantly smaller than that of the control example trap at p<0.01 in the $\chi^2$ test to which the correction of Yates was applied. In addition, the number of the Vespidae wasp worker killed by the test liquid example trap (average: 0, SD: 0) was significantly smaller than that of the number of the Vespidae wasp worker killed by the control example trap (average: 0.67, SD: 0.84) at p<0.01.

Result of Experiment in 2014

In the first experiment and second experiment, 10 traps prepared by adding 5 mL of 2-phenylethanol to 500 mL of grape juice and 10 traps prepared by adding 0.5 mL of 2-phenylethanol to 500 mL of grape juice were used respectively as the 2 kinds of test liquid examples of 1% 2-phenylethanol and 0.1% 2-phenylethanol to conduct the experiment.

When the 1% 2-phenylethanol trap was used, a Vespidae wasp worker was killed by 9 control traps among 10 control traps in the first experiment, and 5 species of workers were included in the killed workers. On the one hand, there was no trap by which a Vespidae wasp worker was killed among 10 test liquid example traps, and the number of the test liquid example trap by which a Vespidae wasp worker was killed was significantly smaller than that of the control example trap at p<0.001 in the $\chi^2$ test to which the correction of Yates was applied. In addition, the number of the Vespidae wasp worker killed by the test liquid example trap (average: 0, SD: 0) was significantly smaller than that of the number of the Vespidae wasp killed by the control example trap (average: 3.30, SD: 2.58) at p<0.001.

In the second experiment, a Vespidae wasp worker was not killed by the test liquid example trap similarly to the first experiment. On the one hand, the number of the control trap by which a Vespidae wasp worker was killed was severely decreased to 3 in comparison with 9 of the first experiment, and there was not a significant difference between the numbers of the both example traps to kill a Vespidae wasp worker. In addition, there was not a significant difference between the numbers of the Vespidae wasp workers killed by the control example trap (average: 0.40, SD: 0.70) and the test liquid example trap (average: 0, SD: 0).

When the 0.1% 2-phenylethanol trap was used, the result of the first experiment was very different from the results of the first experiments using test liquids of 5% 2-phenylethanol (2013) and 1% 2-phenylethanol (2014). Specifically, a Vespidae wasp worker was killed by all of 10 installed test liquid example traps similarly to the control example traps, and 5 species of workers containing only one *Vespa simillima xanthoptera*, which was not killed by the control example trap, were killed. The number of the all species of workers killed by the control example trap tended to be larger than that by the test liquid example trap, but the difference between the examples was not significant. In addition, the numbers of the worker killed in both examples were compared in each species of a Vespidae wasp; as a result, only the number of the *Vespa crabro flavofasciata* killed in the control example was significantly larger than that in the test liquid example at p<0.01.

In the second experiment, a Vespidae wasp worker was killed by only one test liquid example trap, and all of 3 killed workers were *Vespa mandarinia* workers as Table 14.

Consideration of Result

In the above field experiment, a grape juice was injected into a PET bottle attraction trap, which has been widely used for investigation or extermination of a Vespidae wasp, to be used as a control example, and it was tested whether 2-phenylethanol inhibited or not the attracting effect of a grape juice to a Vespidae wasp in 3 concentrations. In both of 2013 and 2014, the experiments were conducted two times with installing traps for about 1 month; however, since the second experiment was conducted mainly in November, which roughly corresponds to the end stage of a long nesting activity period of a certain species of a Vespidae wasp, and the number of the killed worker in the second experiment was generally small, it was considered to be difficult to judge whether 2-phenylethanol exerts influence or not on the basis of the result in the period only. Thus, the inventors collectively consider the result of the experiment for 2 years mainly on the basis of the result of the first experiment with using the result of the second experiment as a supplementary material, since a nesting activity of 4 Vespidae wasps except for *Vespa ducalis*, of which nesting activity period is short, is encouraged in the first experiment period in consideration of a conventional knowledge.

In the first experiment in 2013, 4 species of many workers were killed by the control trap among 5 species of Vespidae wasps, which lives in Shikoku area. In contrast to the result, no worker was killed by the 5% 2-phenylethanol trap, of which concentration was the highest in the experiment. In the second experiment in the same year, 4 species of fewer workers were killed by the control trap; on the one hand, no worker was killed by the 5% 2-phenylethanol trap similarly to the first experiment. With respect to the result of 1% 2-phenylethanol example of 2014, 5 species of many workers were killed in the control example of the first experiment; on the one hand, no worker was killed in the 1% 2-phenylethanol example similarly to the case of 5% 2-phenylethanol example. Even in the second experiment, fewer Vespidae wasp workers were killed by the control example trap, but the number of the worker killed by the 1% 2-phenylethanol example trap was 0. As the experimental result, with respect to both of the number of the effective trap and the number of the killed worker, there was a statistically significant difference between the 5% 2-phenylethanol example or 1% 2-phenylethanol example and the control example. It is concluded by the experimental result that an effect of a grape juice to attract a Vespidae wasp worker can be disabled and 5 species of Vespidae wasp workers are prevented from coming close by adding 1 to 5% 2-phenylethanol to a grape juice. As the result that the number of 5 species of a Vespidae wasp worker killed by all of the 2-phenylethanol example traps having 2 concentrations was 0, an attraction inhibitory effect of 2-phenylethanol is very strong and it is considered that the effect is effective for a broad range of a Vespidae wasp. In addition, since 5 species of many workers were killed by all of the installed 0.1% 2-phenylethanol example traps similarly to the control example in the first experiment of 2014, it is found that a threshold concentration of 2-phenylethanol to inhibit an effect of a grape juice in a PET bottle attraction trap to attract a Vespidae wasp worker is included in a range of 1% to 0.1%.

From the results of the second experiments in 2013 and 2014, both of the number of the trap by which a Vespidae wasp worker was killed and the number of the killed worker were much smaller than those of the first experiments. Even in the second experiment, however, the number of the killed worker was not 0, many workers were killed by the control example trap in the experiment of 2013, in which the number of active worker in the field was considered to be large, and there were significant differences in the number of the trap by which the worker was killed and the number of the killed worker between the control example and the test liquid example of which number of the killed worker was 0. From such a result of the second experiment, any kinds of a Vespidae wasp worker might be always active in the field during the first experiment period in both years. Accordingly, if an attraction inhibitory effect of 2-phenylethanol were to be greatly decreased in the first experiment for about one month, a Vespidae wasp worker would be also killed in the test liquid examples of 5% 2-phenylethanol and 1% 2-phenylethanol. On the other hand, since the numbers of the killed worker by the both test liquid example traps were 0, it is clear that 2-phenylethanol contained in a grape juice maintained the effect thereof for at least about one month. It is found from such experimental results that 2-phenylethanol can maintain the effect to repel a Vespidae wasp for a long time by preventing 2-phenylethanol from rapidly being lost.

Example 6: Response of *Polistes jokahamae jokahamae* Radoszkowski Worker and *P. chinensis antennalis* Pe'rez Worker to Sprayed Benzyl Alcohol The experiment involving a worker group of *Polistes jokahamae jokahamae* Radoszkowski on the exterior wall of a nest found in the campus of Faculty of Agriculture, Kochi University, located on 200 Otsu, Monobe, Nankoku City, Kochi Prefecture, was conducted on Jul. 13, 2015, and the experiment involving a worker of *P. jokahamae jokahamae* Radoszkowski which collected sap bled from sucking mark by adult *Cryptotympana facialis* of Zelkova tree stem planted in a private house in Fuseishi-cho, Takamatsu City, Kagawa Prefecture was conducted on July 19 to 22, 2015. In addition, the experiment involving a worker group of *P. chinensis antennalis* Pe'rez on the exterior wall of a nest found on a branch of a cheesewood planted at a bank of Noda pond located at Fuseishi-cho, Takamatsu City, Kagawa Prefecture was conducted on Jul. 30, 2015.

The experiment was conducted in accordance with the above-described Example 1(1) involving a *Vespa mandarinia* worker, distilled water as a control example spray and benzyl alcohol as a test liquid example spray were sequentially sprayed on a test object group or a test object worker by using a sprayer, and the behavior from immediately after spraying up to 1 minute later was respectively recorded.

Result of *P. jokahamae jokahamae* Radoszkowski

The result of the worker group on the nest surface is shown in Table 15, and the result of the worker during collecting sap is shown in Table 16.

TABLE 15

| Clock time | 10:00 | | 10:01 | 10:02 |
|---|---|---|---|---|
| Sprayed liquid | distilled water | | benzyl alcohol | |
| Number of *P. jokahamae jokahamae* Radoszkowski | 11 | | 11 | 0 |

TABLE 16

| | Sprayed liquid | |
|---|---|---|
| | Distilled water | Benzyl alcohol |
| No response | 10 | 0 |
| Effective | 0 | 10 |

Just before the start of the experiment, distilled water was sprayed once on a group of 11 workers on the nest surface; as a result, it is not observed that the worker left the nest surface. Then, benzyl alcohol was sprayed once 1 minute after spraying distilled water; as a result, all of the workers of the group almost simultaneously flew away from the nest within 10 seconds from immediately after spraying benzyl alcohol, and no worker remained on the nest after 1 minute.

When distilled water was sprayed on the worker collecting Zelkova sap, 1 worker immediately flew away but returned to the original position within 5 seconds and the others continuously collected sap without behavior change. Then, benzyl alcohol was sprayed on the worker 30 seconds after distilled water was sprayed, and the worker flew away after flapping behavior within 1 second or without flapping. Such a result was common to 10 workers targeted in this experiment.

Result of *P. chinensis antennalis* Pe'rez

The result of *P. chinensis antennalis* Pe'rez is shown in Table 17.

TABLE 17

| Clock time | 9:00 | | 9:01 | 9:02 |
|---|---|---|---|---|
| Sprayed liquid | distilled water | | benzyl alcohol | |
| Number of *P. chinensis antennalis* Pe'rez | 32 | | 32 | 0 |

Since the nest of *P. chinensis antennalis* Pe'rez was built in a place surrounded by branches and leaves of a cheesewood, a sprayed solution might be volatilized to the whole nest by one-time spraying; therefore, distilled water and benzyl alcohol 1 minute after spraying distilled water were sprayed respectively twice on each of the upper and lower surfaces of the nest for a total of four times. In the experiment conducted at around 9:00 AM on July 30, no worker among 32 workers on the nest board acted abnormally nor flew away from the nest from spraying distilled water till 1 minutes after. Then, benzyl alcohol was sprayed; as a result, all of the workers flew away from the nest immediately after spraying and the number of the remaining worker 1 minute after spraying was 0 similarly to the case of the above-described *P. jokahamae jokahamae* Radoszkowski. Among the workers which flew away from the nest immediately after spraying benzyl alcohol, some workers alighted on a near branch or leaf of the cheesewood, but such a worker continued to flap in the same place, or even if flew away from the place, the worker did not return to the nest and went missing.

Comparative Example 1: Response of *Apis mellifera* to Sprayed Benzyl Alcohol The experiment involving a *Apis mellifera* worker which was sucking nectar from a flower of Abelia planted at a bank of Noda pond located at Fuseishi-cho, Takamatsu City, Kagawa Prefecture was conducted on Jul. 22 to 24, 2015.

With respect to the experimental condition, first, distilled water was sprayed once on the worker which was sucking nectar or moving from a flower to a flower by using a sprayer, and then the inventors observed the behavior for 30 seconds. Next, benzyl alcohol, 2-phenylethanol or benzyl acetate was sprayed once on the same worker by using the sprayer having the same mass and the same volume, and then the inventors observed the behavior up to 30 seconds. The test liquid was judged to be "effective" in the case where the *Apis mellifera* worker on which the test liquid was sprayed did different action than normal activity to visit a flower during the observation time. The result is shown in Table 18.

TABLE 18

|  | Number of worker | |
| --- | --- | --- |
|  | No response | Effective |
| Distilled water | 10/10 | 0/10 |
| Benzyl alcohol | 10/10 | 0/10 |
| 2-Phenylethanol | 10/10 | 0/10 |
| Benzyl acetate | 10/10 | 0/10 |

As the result shown in Table 18, when distilled water was sprayed on a *Apis mellifera* worker which was sucking nectar, the behavior was not changed and the worker continued a general nectar-sucking activity, in which a worker repeatedly slowly flies, visits a flower and sucks nectar. When benzyl alcohol was sprayed in such circumstances, the behavior of the worker was also not changed and the worker further continued a nectar-sucking activity. Since the result was common to the tested 10 workers, it was confirmed that benzyl alcohol does not effect on the behavior of an *Apis mellifera* worker. The experimental results of 2-phenylethanol and benzyl acetate were the same as the above-described experimental result of benzyl alcohol. Thus, it was clear that the repellent of the present invention does not harm a honeybee, which is a useful insect.

The invention claimed is:

1. A method for repelling a Vespidae wasp, consisting of applying a repellent consisting of benzyl alcohol as a sole active component to at least one member selected from the group consisting of the Vespidae wasp, a nest of the Vespidae wasp, a nest of a Vespidae wasp at a private house, and a beehive,
   wherein a concentration of the benzyl alcohol in the repellent is 10 mass % or more, wherein the method causes no damage to an Apidae bee, and
   wherein the application of the repellent does not result in mortality of the Vespidae wasp.

2. The method according to claim 1, wherein the repellent is a liquid, and the liquid repellent is applied by spraying the liquid repellent on the Vespidae wasp to reduce aggression of the Vespidae wasp.

3. The method according to claim 1, wherein the Vespidae wasp is a Vespinae wasp or a Polistinae wasp.

4. A method for repelling a Vespidae wasp, consisting of applying to at least one member selected from the group consisting of the Vespidae wasp, a nest of the Vespidae wasp, a nest of a Vespidae wasp at a private house, and a beehive, a repellent consisting of benzyl alcohol as a sole active component, and a high pressure gas,
   wherein a concentration of the benzyl alcohol in the repellent is 10 mass % or more,
   wherein the method causes no damage to an Apidae bee, and
   wherein the application of the repellent does not result in mortality of the Vespidae wasp.

5. The method according to claim 4, wherein the repellent is a liquid, and the liquid repellent is applied by spraying the liquid repellent on the Vespidae wasp to reduce aggression of the Vespidae wasp.

6. The method according to claim 4, wherein the Vespidae wasp is a Vespinae wasp or a Polistinae wasp.

* * * * *